INVENTORS
Toru Inoue and
Shuichi Iida,
BY Pierce, Scheffler & Parker
Their Attorneys

3,271,316
METHOD OF MANUFACTURING FERROMAGNETIC OXIDES
Toru Inoue, 356 Soshigaya 2-chome, Tokyo, Japan, and Shuichi Iida, 14A-250 Mt. Vernon Place, Newark, N.J.
Filed June 11, 1965, Ser. No. 463,320
Claims priority, application Japan, Jan. 27, 1961, 36/2,195; Jan. 30, 1961, 36/2,616; Mar. 23, 1961, 36/9,468
8 Claims. (Cl. 252—62.5)

This application is a continuation-in-part of our application Serial No. 165,993, filed January 9, 1962, now abandoned.

This invention relates to a method of manufacturing ferromagnetic oxides of highly controlled quality. The requirements for ferromagnetic oxides and their manufacture are generally to get higher qualities, to control disaccommodation, to establish a sufficiently reproducible manufacturing method that equalizes the quality of the products with each other and, especially for the magnetic material of small size, to obtain homogeneity and high quality.

For these purposes, bulk magnetic material is required to be of a single phase, in the sense of the chemical reaction of oxidation and reduction, and it was proposed that the important point was to keep ferrous ion content constant in the magnetic material. The present inventors have studied these necessary conditions using a more general concept of oxygen content of magnetic material and have discovered that the important point in some cases is to keep the oxygen content strictly within a certain range of magnitude for all the products and at all parts of a product.

In the prior art the solution of above mentioned technical problems was the application of atmosphere control during heat treatment. One or another of several inactive gases such as $N_2$, A, $CO_2$ and $H_2O$, which was mixed with proper amount of oxygen, was used as the atmosphere. Also proposed was such atmosphere control as to vary the oxygen partial pressure of the atmosphere as a continuous or step function of temperature, since the equilibrium oxygen partial pressure is an exponential function of temperature for the material with a fixed oxygen content. To apply this method, however, there is great difficulty in realizing sufficiently continuous atmosphere control and, in practice, such a method is inadequate for mass production in many cases.

Moreover, when the oxygen partial pressure is less than $10^{-4}$ atm., its strict control as a function of temperature is very difficult, and it becomes impossible by conventional methods if the wanted partial pressure decreases to $10^{-6}$ atm. or even less. From the practical point of view, however, such or even finer oxygen partial pressure control is required for some ferrite materials during cooling. At present, quenching at a proper rate is the only answer to this problem. In this case, however, quenching introduces thermal strain and unstable structure to the materials. So, we must be careful in the application of the conventional technique and, in many cases, must be satisfied with more or less undesirable results, comparing the bad influence of quenching with those of surface oxidation (reduction) caused by imperfect atmosphere control.

Moreover, the understanding of the guiding physical principles for atmosphere control has been quite poor and the proper magnitude of the oxygen partial pressure at high temperature was obtained only by repetition of a large number of experiments. The proper value of oxygen content of magnetic materials that is required to obtain desired properties is also not clear and the stoichiometric ratio of 4/7 is supposed to be preferable for ordinary ferrites with spinel structure without any firm reason for the accuracy. But there is not reliable quantitative data on the permissible range of the oxygen content, either scientifically or technically. Under the conventional method, the proper oxygen content of materials and the proper oxygen partial pressure of the sintering atmosphere are determined from the quality of the finished products. Of course, this method is not inadequate in itself, but it was impossible in some cases to find the way of getting products with sufficient reproducibility, until we have come to recognize the fact that in some cases we must control the oxygen content of the products with accuracy of from $10^{-5}$ to even $10^{-9}$. Here and hereafter, the amount of oxygen content being adjusted is defined as the ratio of the amount of the oxygen content adjusted to the total amount of the oxygen content present in the magnetic oxide. It is noticed that, since the present invention is concerned with a very strict control of oxygen content, the total oxygen content of the magnetic oxide as the denominator of the ratio can be calculated from the total weight of the ferromagnetic oxide and it does not change effectively before and after the heat treatment being considered. Conventional studies employing ordinary chemical analysis or similar tools the accuracy of which is only $10^{-4}$ or worse are insufficient to get the desired properties consistently. Take as an example, disaccommodation. In the past there has been no technique for some ferrites to produce disaccommodationless magnetic materials reproducibly without having undesirable influence on other physical properties. These problems are solved by the present invention.

Therefore, the principal object of this invention is to provide a method of manufacturing ferromagnetic oxides especially those having the oxygen content strictly equal to the desired value.

Another object of this invention is to provide a method of manufacturing ferromagnetic oxides by which we can make a large number of products without fluctuation of oxygen content.

Another object of this invention is to provide an efficient method of oxygen partial pressure control, pointing out the importance of the appointment of precise oxygen partial pressure and of the continuous control of the pressure as a function of temperature.

Another object of this invention is, moreover, to provide a method of manufacturing ferromagnetic oxides that can control oxygen content and, in particular, cation vacancy density with the necessary and sufficient accuracy that is needed to suppress disaccommodation.

One feature of the present invention is to provide a method of manufacturing ferromagnetic oxide which comprises placing in an air-tight sealed container ferromagnetic oxides which have already received an oxygen content appointing heat treatment with controlled atmosphere together with an oxygen content-adjusting agent, such as an oxygen absorbing agent or oxygen supplying agent including oxygen gas itself, the amount of which is less than $10^{-3}$ and the accuracy of which is indicated by a tolerance of at most less than $5 \times 10^{-4}$ in terms of the proportion of the amount of oxygen to be adjusted to the total oxygen content of said ferromagnetic oxides; evacuating the interior of the container; sealing the container by melting; placing the container in a furnace; and adding heat-treatment to a part (or the whole) of said container and carrying out a sintering or a slow cooling or a rapid cooling while maintaining the interior oxygen content constant in this way. This method can be employed as a process for manufacturing ferromagnetic oxides. It is assumed that the content of oxygen of the starting ferromagnetic oxides has been adjusted to less than $10^{-3}$, in terms of the deviation from the proposed content which is defined by the desired magnetic properties to be improved by this method, with a tolerance of less than $5 \times 10^{-4}$ in terms of the same. So that the proposed method presents a method of manufacturing ferromagnetic oxides with desirable oxygen content with the accuracy of a tolerance of less than $5 \times 10^{-4}$ in terms of the deviation from the content corresponding to the desired best magnetic properties. The restriction imposed to the adjustment to an oxygen content to a desired fixed value with an indicated tolerance below $5 \times 10^{-4}$ means that the present invention has its meaning only when such severe restriction is required. The tolerance is defined in the following way. Let W and $W_D$ be the oxygen contents of a ferromagnetic oxide after heat treatment and, respectively, of the ferromagnetic oxide with the desired magnetic properties. Then the deviation of the oxygen content $\nabla \rho_0$ is defined by $$\Delta \rho_0 = \frac{|W - W_D|}{W_D}$$

and the requirement for the tolerance is $\Delta \rho_0 < 5 \times 10^{-4}$. The maximum value of the tolerance is so chosen as to distinguish the present invention from the prior techniques which are considered to have tolerances of more than $5 \times 10^{-4}$. It is well known to heat treat the so-called ferromagnetic oxide by means of a sealed tube technique, but what is meant by the present invention is to use a sealed tube technique for controlling the oxygen content with the indicated accuracy (for instance the stoichiometric content with a fixed tolerance of $\pm 10^{-8}$) in order to control various magnetic characteristics which are very sensitive to the oxygen content.

Another feature of the present invention is to provide a novel method of manufacturing a ferromagnetic oxide without disaccommodation which comprises having both a ferromagnetic oxide after a controlled atmosphere heat treatment and two species of oxides of the same metal with different degrees of oxidation, namely $MO_n$, $MO_m$, $0 \leq n < m$, unmixed in a container, evacuating the interior of the container, sealing the container by melting, placing the container in a furnace, making use of the equilibrium partial oxygen pressure P(T) obtained by a chemical equilibrium between said two species of oxides to control the interior oxygen pressure automatically, and changing a temperature of the ferromagnetic oxide to be heat-treated and that of oxides for controlling the oxygen pressure, simultaneously or independently. In this method of manufacturing a ferromagnetic oxide, the desired oxygen pressure with certain tolerance can be obtained by the automatic oxygen pressure controlling agent.

Another feature of the present invention is to apply the above mentioned procedure without adding an additional oxygen supplying agent or oxygen pressure controlling agent. In this case the oxygen supplying agent or oxygen pressure controlling agent is the ferromagnetic oxide itself. In general ordinary atmosphere control technique gives a ferromagnetic oxide which is somewhat over oxidized at the surface or the grain boundary and this part serves as an oxygen supplying agent or an oxygen pressure controlling agent. It is not difficult to select the preceding controlled atmosphere heat treatment so as to have the best total amount of oxygen content which corresponds to the best magnetic properties after the second heat treatment with an indicated tolerance.

It is noticed that the present techniques are entirely different from the known technique presented in the United States Patent No. 3,066,103 to Owen. In said patent it was proposed that a mixture of oxides is placed in a so called gas-tight sealed furnace having initially an air atmosphere, together with an oxidizable material, the furnace is heated, and the atmosphere in the said furnace is controlled automatically by means of the oxidizable material. The present technique has to employ a ferromagnetic oxide which had been prepared by a heat treatment in a controlled atmosphere, and the same must be sealed by melting in a small container after evacuating the interior air of the container. The evacuation and the sealing of the container by melting of the same material as the container means that even the contents of oxygen remained in the original controlled atmosphere, absorbed in the wall of the so-called gas-tight sealed tube or leaked from the lids is easily more than $10^{-3}$ and is not permissible. The effective control of disaccommodation of high quality manganese-zinc ferrites has been achieved only by the adoption of such a strict and fine technique, and the same was invented after discovering the theoretical necessary requirements of the control.

These and other objects and advantages of the present invention will become more apparent with a pursuance of the following specification taken in connection with the accompanying drawings wherein.

Table I is numeral values of relaxation time of induced anisotropy in ferrite at room temperature. Parameters are the value of activation energy and the density of cation vacancies.

FIGS. 6, 7 and 8, 9 show two other examples for a tunnel furnace which utilize the temperature gradient in transverse directions.

FIGS. 24, 25, 26 and 27 show results of the measurement of disaccommodation by using the apparatus of FIG. 23.

When the oxygen content of ferrite deviates from the stoichiometric value, precipitates come out generally. It has been widely expected that the magnetic properties of ferrite are improved by merely preventing such precipitates from appearing. But the present inventors conclude from their study that this is too optimistic a view. The detailed study of the magnetic field annealing effect of Fe-Co ferrite, which has led to the present invention, has made it clear that the magnetic properties of ferrite, especially the value of induced magnetic anisotropy in this case, are so much influenced by its oxygen content that sometimes it must be controlled within the accuracy of even $10^{-9}$. Since equilibrium oxygen partial pressure P varies exponentially with temperature, it is impossible to maintain equilibrium within such a high accuracy throughout a heat treatment. In this connection the use of a sealed container, one of the features of the present invention, was devised to control oxygen content uniformly all over the material and consequently to control effectively the value of induced magnetic anisotropy. The theoretical study carried out at the same time predicted that the relaxation time of the induced magnetic anisotropy of Fe-Co ferrites is inversely proportional to its cation vacancy density $\rho$, and the prediction was verified quantitatively by the experimental data.

Figure 1:
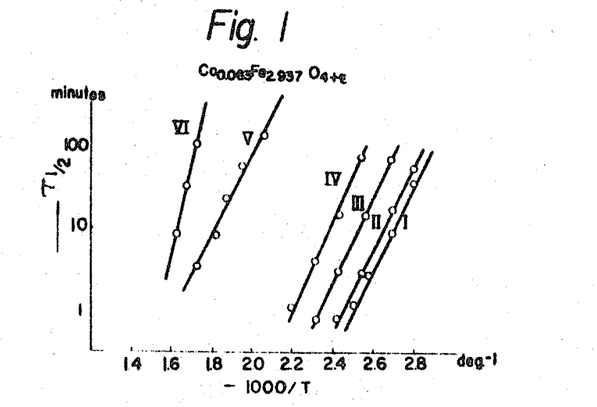
FIG. 1 is a logarithm of $\tau_{1/2}$ of $Co_{0.063}Fe_{2.937}O_{4+\epsilon}$ plotted against the reciprocal of temperature for the specimens with various concentrations of cation vacancies. $\rho \cdot \tau_{1/2}$ is the time necessary for the induced anisotropy to relax half of the initial value in an isothermal annealing process after changing the direction of magnetizing.

FIG. 1 of the drawings shows the temperature dependence of the relaxation time of induced magnetic anisotropy of several Fe-Co ferrites, namely $$Co_{0.063}Fe_{2.937}O_{4+\epsilon}$$

which are all same in metallic composition but are differently controlled in cation vacancy density by the technique of the present invention. In this figure the logarithm of $\tau_{1/2}$ is plotted against the reciprocal of absolute temperature for several specimens containing cation vacancies in different densities. Here $\rho$ is the value of density of cation vacancies, which are expected to be created by the sealed container technique and $\tau_{1/2}$ is the time necessary for the induced magnetic anisotropy to decrease to a half of its initial value $\rho$ of each specimen is as follows; (I) $1.6 \times 10^{-3}$, (II) $10^{-3}$, (III) $3 \times 10^{-4}$, (IV) $3 \times 10^{-5}$, (V) $6 \times 10^{-8}$. (VI) is the curve for the specimen which was annealed at 1000° C. in the oxygen atmosphere of $10^{-3}$ mm. Hg and homogenized its oxygen concentration further by a sealed tube technique. This data shows a powerful effect of the control of cation vacancy density ranging from $10^{-2}$ to $10^{-9}$ to the induced magnetic anisotropy of ferrites. The present technique enables us to control induced magnetic anisotropy of Co added ferrites and to produce magnetic materials with an appointed anisotropy constant with desired properties such as characterize constricted hysteresis loop ferrite.

As a further result of the study it has become clear that completely same mechanism is generally working in the formation of induced magnetic anisotropy of ferrite. That is, the directional redistribution of several kinds of cations due to ionic diffusion induced chiefly through vacancy diffusion mechanism is the origin of such magnetic anisotropy. The disaccommodation of some ferrites observed at room temperature arises from the creation and annihilation of such magnetic anisotropy at room temperature. Table 1 shows numerical values of estimated relaxation time of induced magnetic anisotropy at room temperature for various values of two parameters, activation energy and cation vacancy density. It is to be noted here that 1 day  = $0.86 \times 10^5$ sec.
1 month = $2.6 \times 10^6$ sec.
1 year = $3.15 \times 10^7$ sec.

and 1 century = $3.15 \times 10^9$ sec.

In the case of Mn-Zn ferrite, which has activation energy of approximately 0.7 e.v., $\rho$ must be kept less than $10^{-8}$ by proper method to obtain 3 years for relaxation time. Automatic control of oxygen pressure by proper agents, one feature of the present invention, and the technique of sealed container, another feature, were devised to perform such strict atmosphere control. These two techniques give us an efficient method of controlling vacancy density $\rho$ easily. Also they enable us to know with ease the value of the appropriate oxygen partial pressure in desired gaseous atmosphere. Owing to this, we came to the invention manufacturing the aforementioned ferromagnetic oxides without disaccommodation.

Furthermore the present inventors studied the properties of ferrite without cation vacancies and ferrite containing excess cation, using the aforementioned techniques. The results were that magnetic properties of Mn-Zn ferrites were much changed by the existence of merely $10^{-5}$ excess cations. Anyway it was recognized that magnetic properties of ferrite are strongly influenced by the strict control of its oxygen content, whether oxygen is in excess or deficient. This fact gives proof of the wide utility of the present invention.

In the present invention homogeneity of the oxygen content of the magnetic oxide means that it is homogeneous within a grain which has the crystal structure of matrix phase and wherein magnetic domain walls can move freely. Grain boundaries and other unusual parts are not considered here.

As for the strict control of oxygen partial pressure in the gaseous atmosphere, it is commonly known that the equilibrium oxygen partial pressure of magnetic oxides varies as an exponential function of T, i.e., like exp $(-Q'/T)$. The present inventors presented the results of a detailed study of this point as early as 1956. (See J. Phys. Soc., Japan, 11 846.) It is evident that the required oxygen partial pressure amounts to $1 \sim 10^4$ atm. for the highest case and to $10^{-4} \sim 10^{-30}$ for the lowest. Strict and reproducible control of oxygen partial pressure over such a wide range can be efficiently performed by use of automatic oxygen partial pressure controlling agents and the container isolated from external atmosphere with necessary and sufficient accuracy.

The present invention employs the equilibrium oxygen partial pressure and its temperature dependence for the equilibrium co-existence in the same temperature of two different oxides of an element capable of forming more than two species of oxides. Let this equilibrium oxygen partial pressure be $$P = g(T')$$

and assume that we are to control the oxygen partial pressure in gaseous atmosphere as $$P = f(T) \quad T_1 < T < T_2$$

$T_1$ and $T_2$ are the lowest and highest temperatures between which the partial pressure of oxygen is proposed to be controlled. Then, for any temperature in the range $T_L < T < T_H$, wherein we can establish the above equilibrium partial pressure, we can always find out $T'$ which satisfies $$f(T) = g(T') \qquad (1)$$

i.e.

$$T' = h(T) \qquad (2)$$

provided that $$g(T_L) < f(T_1) < f(T_2) < g(T_H) \qquad (3)$$

Figures 3, 4, 5:
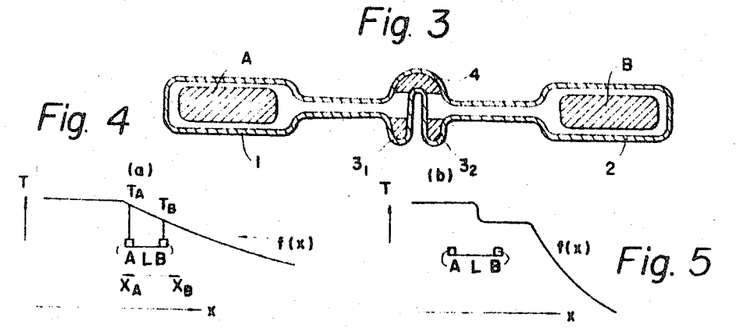
FIG. 3 is an example of container suitable for the heat treatment with the cock at high temperatures.
FIGS. 4 and 5 show two examples of temperature variation curve along the path of a tunnel furnace and their suitable apparatus for the controlling of oxygen pressure during firing and cooling.
Figures 6, 7, 8:
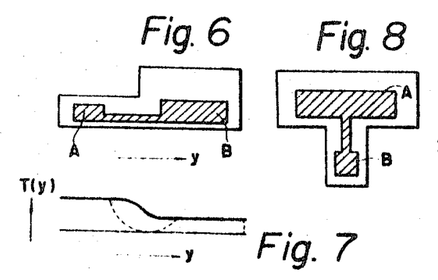
FIGURES 6 and 8 show the cross sections of the furnaces and FIGURES 7 and 9 show their temperature variations.
Figure 9:
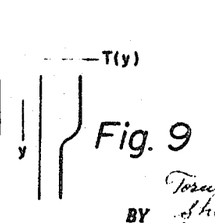
Figure 10:
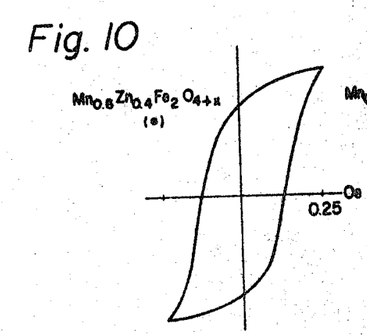
FIGS. 10 to 14 show the magnetic properties of ferromagnetic oxides with the chemical formula
Figure 11:
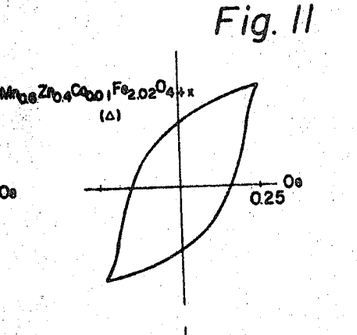
Figure 12:
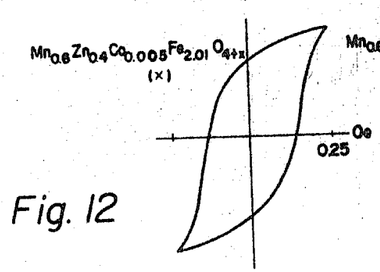
Figure 13:
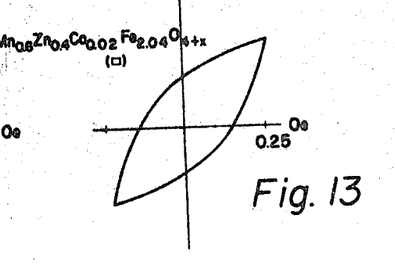

So, if we change temperature $T'$ of the controlling agent in such a way as given by the above Equation 2 as a function of temperature T of the material to be heat treated and both materials necessarily and sufficiently isolated from external atmosphere by a proper container, the automatic control of oxygen partial pressure can be performed. As container materials, for instance, $Al_2O_3$ with suitable airtightness, quartz, platinum, hard glass and their combinations are operable. It may contain more than two sorts of automatic oxygen partial pressure controlling agent, separated from each other, the path between which can be opened or closed by a proper cock such as shown in FIG. 3. As examples of automatic oxygen partial pressure controlling agents, the following combinations are proposed;

$Cu_2O \rightleftarrows CuO$, $CoO \rightleftarrows Co_3O_4$, $FeO \rightleftarrows Fe_3O_4$, $Fe_3O_4 \rightleftarrows Fe_2O_3$
$MnO \rightleftarrows Mn_3O_4$, $Mn_3O_4 \rightleftarrows Mn_2O_3$,
$V_2O_3 \rightleftarrows VO_2$, $VO_2 \rightleftarrows V_2O_5$ etc. As the further possibilities the present inventors suggest the addition of the second metallic compositions, which gives buffer action to the agent or produces an improved agent which has T nearly equal to T'.

Figure 2:
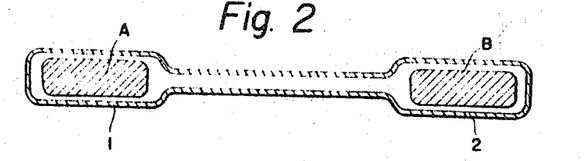
FIG. 2 is an example of container with an open path for the atmosphere in a case where different furnaces are used for part 1 and part 2.

In FIGS. 2 and 3 examples of the container used for automatic oxygen partial pressure control are illustrated.

In these figures, 1 is the part of the container where A, the magnetic material to be heat treated is placed, and 2 is the part of the container where the mixture of two oxides B of the same metal with different degrees of oxidation are placed.

FIG. 2 shows an example of containers, which has an open path of atmosphere. FIG. 3 shows another example. This type of container has a particular cock, which is composed of a properly curved pipe filled with a material having a suitable melting temperature. This is suitable for the heat treatment, at which the temperature of a cock becomes inevitably high. The container of FIG. 2 is especially suitable for the strict control of oxygen content, since it is a completely sealed container. FIGS. 4 to 9 show some cases where the automatic oxygen partial pressure control is actually applied to the heat treatment in a tunnel furnace. FIGS. 6 to 9 give two other cases where a tunnel furnace with temperature gradient in transverse direction is used. Cross section of a furnace and temperature distribution in it are given in the figures.

For automatic control of oxygen partial pressure, the following further strict method is proposed. This is a heat treatment of obtaining strictly appointed oxygen content by means of sealed container technique.

At relatively lower temperature, i.e. below 1200° C. the rate of oxidation of magnetic oxide is generally reduced by a considerable degree with the decrease of temperature. It is also a function of the difference between the pressure of the external atmosphere and the equilibrium oxygen partial pressure at the given temperature. The time for the system to approach equilibrium in terms of oxidation greatly increases with the decrease of temperature and at last becomes actually infinitely long i.e. the system comes to a metastable state. So it is impossible to attain desirable oxygen content uniformly all over the material at lower temperature, as far as we stick to the method in which the oxygen partial pressure of external atmosphere is adjusted to the equilibrium oxygen pressure. The application of sealed container technique to industry was invented to eliminate these incompletenesses of the conventional method. In this new method the magnetic oxides to be heat treated are sealed in an airtight container of platinum, quartz, glass, $Al_2O_3$ etc. after a suitable pre-heat-treatment. Thus the amount of oxygen in a container is fixed in a strict way. After that, heat treatment, such as sintering, annealing, slow cooling and quenching is performed. The amount of the oxygen that effectively acts on magnetic material, is increased or decreased by the existence of suitable amount of gas containing oxygen or oxygen supplying agent like $CrO_3$, or the existence of suitable amount of oxygen absorbing agent such as Mg, Al, Fe etc. sealed in the container at the same time. When we take sufficient amount of magnetic oxide and put it in a sufficiently small container, the amount of the oxygen which should be existing during heat treatment in gaseous phase inside the container can be made negligibly small, and does not have serious influence on the oxygen content of magnetic material. At high temperature this gaseous oxygen causes the deviation of oxygen content from the intended value but it also does not harm to magnetic properties, since the single phase region becomes wider with the temperature increase. In other words magnetic oxide itself serves here as an automatic oxygen partial pressure controlling agent, which was mentioned above.

Figure 14:
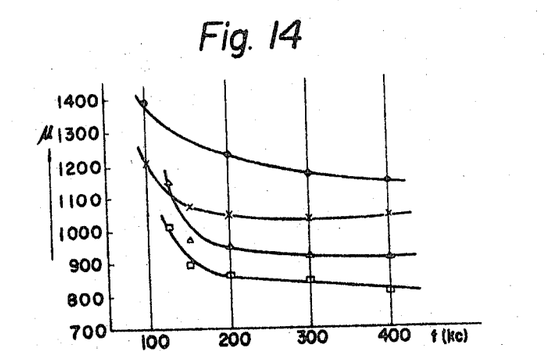
Figures 15, 16:
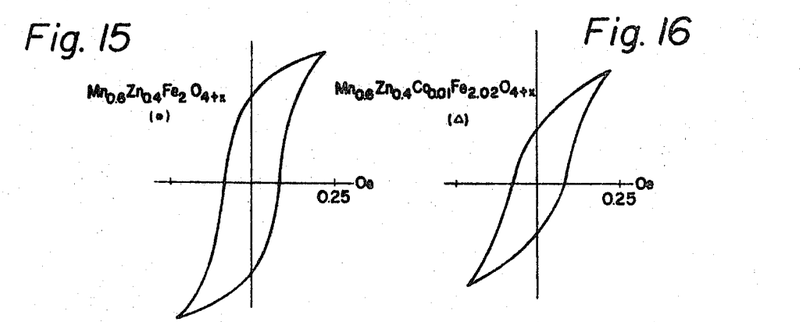
FIGS. 15 to 19 show the magnetic properties of the same oxides after applying the present invention of accurate heat treatment with definite oxygen content.
Figure 17:
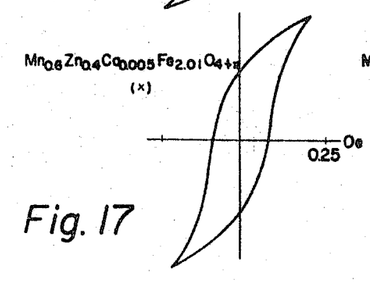
Figure 18:
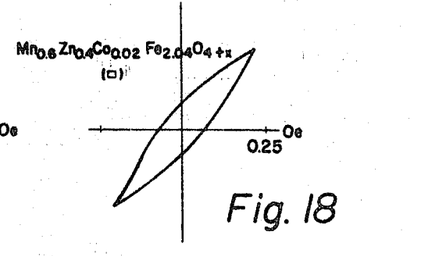
Figure 19:
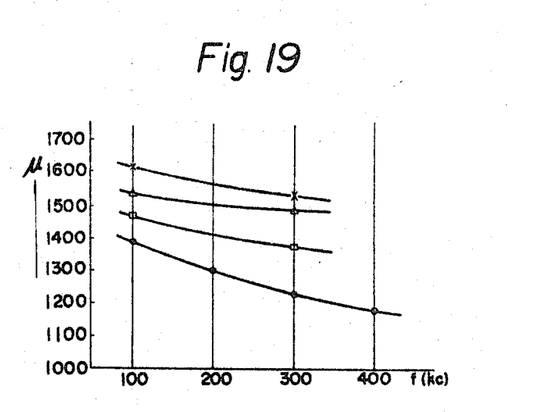

It can be concluded from FIG. 1 of the drawings and Example 1 that by the application of this method, the vacancy density $\rho$ of Fe-Co ferrite was controlled in the range of $10^{-3} \sim 10^{-8}$ and sometimes even the control of $\rho$ less than $10^{-9}$ was possible. As shown in FIGS. 10 to 19 the present method, when applied to Mn-Zn ferrite containing a little $CoFe_2O_4$, brought about such good results as regards improvement of permeability; decrease of loss factor etc. FIGS. 10 to 14 show the magnetic properties of ferromagnetic oxides with the chemical formula $Mn_{0.6} Zn_{0.4} Fe_2O_{4+x}$ . $^NCoFe_2O_{4+x}$ . FIGS. 15 to 19 show those of the same material after the application of the present invention namely accurate heat treatment of the present invention, which, as observed, resulted with definite oxygen content, in remarkable improvement of magnetic properties. In FIGS. 14 and 19, each curve corresponds to the specimen in FIGS. 10–13 and 15–18 with the same code indicated in the bracket under the chemical formula.

The method mentioned above was also employed in the control of disaccommodation of Mn-Zn ferrite and, as a remarkable result, the value of $\Delta\mu/\mu$ at $10^3$ sec. after A.C. demagnetization was lowered to less than 0.02% while causing no loss of other magnetic properties. Tan $\delta/\mu_0$ was decreased sufficiently at the same time.

To perform a strict control of oxygen content, which is always required to acquire the highest magnetic qualities, it is necessary to know the exact value of the desired composition and the oxygen content of the magnetic oxide which we are going to heat treat by the method of the present invention. This becomes possible by measuring the concern magnetic property and studying its dependence on the oxygen content by repeated use of the present invention. It is not possible to get an exact concentration of oxygen corresponding to the desired magnetic properties with an accuracy less than $5 \times 10^{-4}$ by an ordinary method. It is, however, possible to get the exact value of the deviation of the concentration from the desired concentration by employing the present method and this value is sufficient to apply the present invention in order to get the desired magnetic properties. For instance the lowest value of tan $\delta/\mu_0$ is known in the following way. At first, we perform its measurement for the specimens which were sealed in a container and given the treatment of the present invention, after having been heat treated by the method of ordinary atmosphere control. It is noticed that the specimens now have the same oxygen concentration. Then a certain amount of oxygen is added to or taken off from one of the specimens by the heat treatment using the technique of the present invention. The temperature of this treatment is so determined as to prevent recrystallization of the specimen etc. The repeated measurements of this sort give a curve showing the dependence of tan $\delta/\mu_0$ on the relative change of the oxygen content. This curve turned out to have a minimum point at a certain oxygen content. Then, in the industrial application, it is sufficient to increase or decrease the oxygen content to the value at which this minimum value of tan $\delta/\mu_0$ is attained. This is performed by only one or two heat treatments owing to the present invention after the application of ordinary atmosphere control.

It is often desirable for ferrite with spinel structure to have the molecular ratio of 3:4. But in the case of those with a 3rd metallic component added, the ideal ratio of metallic ions to oxygen ions differs from 3/4. Among such cases is the situation that the precipitates formed between grains raise the electric resistance, thus reducing tan $\delta/\mu_0$. This method is especially useful in these cases to let the oxygen content have the desired value strictly.

It is remarked that this method is specially fitted to be used with a tunnel furnace.

The establishment of the strict control of oxygen partial pressure has also opened the way to the method of preparing magnetic material without disaccommodation. By the use of the above mentioned techniques it has come to be possible to control the oxygen content of material so accurately that its deviation is less than $10^{-4}$ and sometimes as small as $10^{-10}$ and also to get the oxygen content uniformly constant all over the material. Consequently magnetic properties of magnetic oxides highly controlled in its oxygen content and their change due to the deviation of composition from stoichiometry came to the light. When cation content is in excess, precipitation of a second phase starts. The solubility limit of the excess cation content was determined experimentally by the present invention and turned out to be less than $10^{-5}$ in the case of Mn-Zn ferrite partly described in Example 6. So it commonly happens that even $10^{-5}$ excess of cation vacancy is undesirable and sometimes the accuracy higher than $10^{-7}$ is needed. This restriction can be relaxed for $Mg^{++}$ and other cations which have large solubility limit.

The existance of precipitates are permitted to some extent, as far as they segregate at grain boundaries. In the case of hard magnetic materials and square loop materials, the situation is same or sometimes it is required to have a certain amount of precipitation in a controlled manner.

Next we consider the opposite case, when the oxygen content is more than stoichiometric value.

The study performed by the present inventors showed that cation vacancies are easily formed at that time. The single phase region, is, therefore, comparatively wide and the precipitates do not appear until the deviation from stoichiometry reaches $10^{-3} \sim 10^{-4}$. But, in ferrites, the existence of vacancies generally enables various kinds of cations to migrate in the crystal lattice in the temperature region wherein they are ferromagnetic. This migration of ions gives rise to directional feature of the distribution of various cations among normal cation sites and therefore causes what is called induced magnetic anisotropy. If annihilation and creation of such magnetic anisotropy occur at the working temperature range of the material, which covers room temperature, this process is observed as disaccommodation. According to the theoretical and experimental studies of the present inventors the relation time of such induced magnetic anistropy is expressed by $$T_R = \frac{1}{\beta \rho f_0 \exp(-Q/T)} \quad (4)$$

Here $\beta$ is a dimensionless quantity with the value of $10^0 \sim 10^{+2}$. A simplified calculation gives the approximate value 9.6 for it. $\rho$ denotes the cation vacancy density, $f_0$, the average frequency of lattice vibration, Q, the minimum value of average activation energy of such cation migration processes as related to disaccommodation, and T, the working temperature. If we approximate $f_0$ with $3 \times 10^{12}$ sec$^{-1}$ and consider that the above equation holds with the error of $10^1 \sim 15^{1.5}$, the necessary condition for $T_R$ to be longer than 3 years, that $0.95 \times 10^8$ sec., is derived. It is the inequality $$\rho < 10^{-20} \times \exp\left(\frac{Q}{\mu T}\right) \quad (5)$$

which shows one of the actual values of the cation vacancy density to be controlled according to the present invention.

To appreciate the condition that $T_R > 3$ years it is helpful to note that $\Delta \mu_0/\mu_0$ the ratio of decrease of $\mu_0$ to its initial value is approximately $$10 \times (1-e^{-1})\% = 6\% \quad (6)$$

for the first three years, and $$10 \times (1-e^{-1/3})\% = 3\% \quad (7)$$

at the end of the 1st year, provided that $\Delta \mu_0/\mu_0$ is 10% for infinitely long period. The decrease during the 1st $10^3$ sec. is equal to $$10 \times (1-e^{-10^{-5}})\% = 10^{-4}\% \quad (8)$$

and is exceedingly small.

From the view of practical use, however, another condition that the increase of disaccommodation $\Delta \mu_0/\mu_0$ is less than 0.5% at $10^3$ seconds after A.C. demagnetization, must be also satisfied. This comes from the practical problems and are related to the homogeneity of vacancy density. Even if most parts of magnetic oxide are strictly controlled in vacancy density, which is governed by (5), still there remains some excess vacancies on the surface or at other small parts of the material, because the oxidizing atmosphere actually employed at low temperature has some deviation of composition from that in equilibrium. Such situation is inevitable in industry. Then magnetic oxide may have a little smaller relaxation time, but this can be often permissible for practical purpose as far as $\Delta \mu_0/\mu_0$ at $10^3$ sec. after A.C. demagnetization caused in this way is less than about 0.5%. For such disaccommodation finishes in a short time and consequently can never be larger as long as (5) holds for the control of the total disaccommodation. There is another possible way to loosen the restriction imposed on atmosphere control during cooling. It is the case where various single or double oxides such as $SiO_2$, $CaO$, $ZrO_2$, $TiO_2$ etc. which form layers of other phase and inhibit oxygen atoms from passing through easily are added. But they must not disturb the homogeneity stated above. These conclusions about oxygen content required to prevent disaccommodation and about the proposed accuracy of control were obtained from the theoretical and experimental studies, which were performed, using the two techniques described.

In the method of manufacturing a ferromagnetic oxide with controlled disaccommodation, the desired oxygen content of material shown in Equation 5 can be within the accuracy higher than $10^{-4}$, and sometimes even equal to $10^{-10}$. So it is urgent to control the oxygen content in so accurate a manner. This is especially important in preparation of the magnetic materials with low activation energy Q of the cation diffusion. But we can easily arrive at the method of controlling oxygen content so as to prepare well-controlled magnetic oxide, if we start from the basic quantitative condition (5). In this connection it must be noted that the techniques mentioned above are of remarkable use when applied to determination of the condition of required control or to actual preparation.

In order to obtain the magnetic material with desired content, we must generally consider not only equilibrium oxygen partial pressure corresponding to the desired composition but the rate at which the oxygen content of the material comes to the equilibrium value. This rate is fairly high at elevated temperature, namely above about 1200° C., but is much reduced when temperature is lowered to about 600° C. In industry, therefore, it is an easy way to attain the desired oxygen content at high temperature, e.g., during sintering. In this case, the oxygen partial pressure of atmosphere may be also controlled during cooling so as to keep the attained oxygen content constant.

Since the rate at which equilibrium is established becomes large at high temperature, it is inevitable in this procedure to pass across the temperature region wherein this rate is still large. Thus it is required to make a strict control of atmosphere and inhibit chemical reaction to some extent by choosing suitable cooling process. In this connection the techniques of the present invention is of much use. Another possible way is to anneal magnetic oxide at relatively low temperature, i.e., below 1200° C. for a long time, employing the above mentioned techniques or making strict control of oxygen partial pressure and to perform a suitable cooling subsequently.

In the latter case requirement on atmosphere control is not so severe, since the rate of access to equilibrium is low in such low temperatures. But the application of the present new techniques is especially effective; for the rate of coming to equilibrium during annealing shows also a remarkable decrease with decreasing temperature. With all the decrease of the rate of access to equilibrium, the rate of oxidation and reduction still quite large till the temperature comes to be as low as about 150° C., provided that the equilibrium oxygen partial pressure corresponding to the oxygen content of material is different from the oxygen partial pressure of external atmosphere considerably in a logarithmic scale. Such situation brings much difficulty about controlling and homogenizing cation vacancy density by low temperature annealing in strict way. Then, in the next paragraph, the most reliable method of controlling cation vacancy density will be presented.

This method consists of two or three stages of heat treatment schedule.

The 1st stage is sintering under ordinary atmosphere control, by which we make the oxygen content of material as close to desired value as possible at sintering temperature. Then the material is cooled rapidly in a suitable way and at that time, change of atmosphere or, if possible, the control of oxygen partial pressure as a function of temperature should be applied. The desirable composition of the magnetic oxide, when this stage of heat treatment is to be applied to it, lies in somewhat oxygen rich region in order to prevent precipitation in some cases. In the 2nd stage the material pre-heat-treated in the 1st stage, is confined in a container, which is airtight with necessary and sufficient degree, with the automatic oxygen partial pressure controlling agent such as $Fe_3O_4$-$Fe_2O_3$, $MnO$-$Mn_3O_4$ etc., is annealed at a certain low temperature below 1200° C. and then is cooled slowly. At that time the oxide to be heat treated and the automatic oxygen partial pressure controlling agent are put in different places, separated from each other. So the temperature of the agent can be regulated independently of that of the material. Thus we are able to decrease disaccommodation efficiently while keeping other magnetic qualities as high as possible by the application of the method stated above.

If the cation vacancy density comes within the desired range by these two stages of heat treatment, the magnetic oxide can be put into use in that state as a completely finished one. In some cases, however, the cation vacancy density cannot be sufficiently controlled by such treatment without disadvantage to other magnetic properties. Then the 3rd stage must be added to the heat treatment schedule.

In the 3rd stage of heat treatment, the material, to which the above two stages of treatment have been given, are sealed in an airtight tube with suitable amount of oxygen absorbing agent such as Mg, Al, Fe etc., annealed at suitable temperature and then slowly cooled. The amount of oxygen absorbing agent is determined so as to reduce the number of vacancies remaining in the oxide to the value within desired range, using the calibration curve known in advance.

After these three stages of heat treatment, the magnetic oxide comes to have desired cation vacancy density and also becomes much improved in other magnetic properties. But this heat treatment schedule is presented as an example of the most strict atmosphere control. For many magnetic oxides we can accomplish satisfactory result by applying only the 1st stage of treatment. Sometimes we can skip over the 1st two stages and start with the 3rd stage used at annealing. Apart from such division into three stages, many different procedures of controlling cation vacancy density are possible and the most appropriate one is to be put into use at each case, determined by the consideration about the effects on other magnetic properties and also the economical problems involved.

It is noticed that the accurate value of equilibrium oxygen partial pressure can be determined from the direct measurement of it at high temperature. Sufficient amount of the porous or powdered specimen, which has been strictly controlled in oxygen content by the above three stages of heat treatment, is sealed in an airtight container in high vacuum. The container is equipped with a vacuum gauge, with which we can measure the oxygen pressure. P-T diagrams thus obtained are useful to the ordinary method, i.e., annealing in mixed gas of normal pressure. Annealing in gas that has passed through the automatic oxygen partial pressure agent is also proposed as an efficient procedure.

Figures 20, 21:
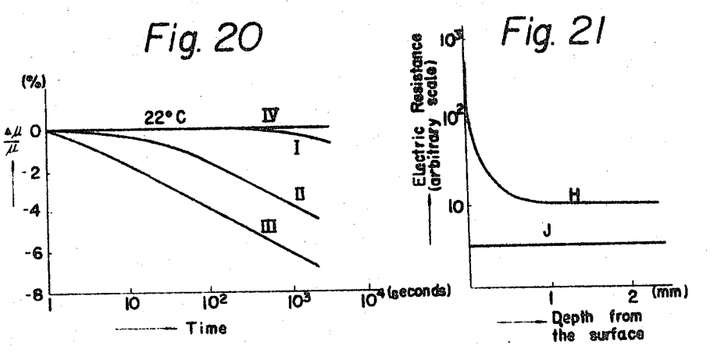
FIG. 20 shows the disaccommodation of Mn-Zn ferrites before and after applying a heat treatment of the present invention.
FIG. 21 shows the difference in electric resistance as a function of depth from the surface, of the two Mn-Zn ferrites before and after applying the present invention technique.

FIGS. 20 to 27 of the drawings present the examples of the application of the present invention. Curves I and II in FIG. 20 are the curves of disaccommodation of Mn-Zn ferrite prepared, employing what is called strict atmosphere control, in which inactive gas is used. Here $\mu_0$ is ordinarily equal to 5300. Curve I is for a large toloid and curve II for a small one. As seen from these curves, the specimen of curve I is fairly strictly controlled and has $\Delta\mu_0/\mu_0$ of 0.7% after $10^3$ sec. while the specimen of curve II has $\Delta\mu_0/\mu_0$ of 4%, which suggests that the conventional method is unreliable. Curve H of FIG. 21, the plot of electric resistance of the same oxide against the depth from the surface, reveals that the surface layers are exceedingly oxidized. The curve III was obtained when the material of curve I was sealed in a quartz container, annealed at 1100° C. for 12 hours, cooled slowly down to 600° C. at the rate of 1° C./min., annealed again at 600° C. for 12 hours and then cooled slowly at the rate of 1° C./min. down to room temperature. Curve IV is the result in the case where the same procedure was adopted with a little amount of iron powder added as oxygen absorbing agent. The amount of Fe was so chosen as to decrease its oxygen content by 0.1%, if Fe was wholly turned into $Fe_2O_3$. The large disaccommodation in curve III is due to the fact that the vacancies, which had initially existed at the surface, are scattered all over the specimen. In the case of curve IV, which was properly controlled in vacancy density, $\mu_0$ is equal to 3000, tan $\delta/\mu_0$ shows much improvement, and $\Delta\mu_0/\mu_0$ after $10^3$ sec. is less than 0.02%. Curves H, J of FIG. 21 are the variation of its electric resistance with the depth from the surface before (H) and after (J) applying the present invention technique, from which we can conclude that strict and uniform control of vacancy density has been attained.

Figure 22:
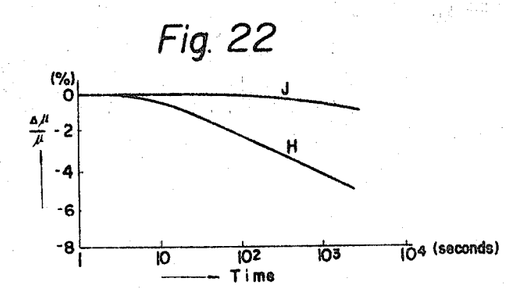
FIG. 22 shows the difference in the disaccommodation of the two Mn-Zn ferrites before and after applying the present invention technique.
Figure 23:
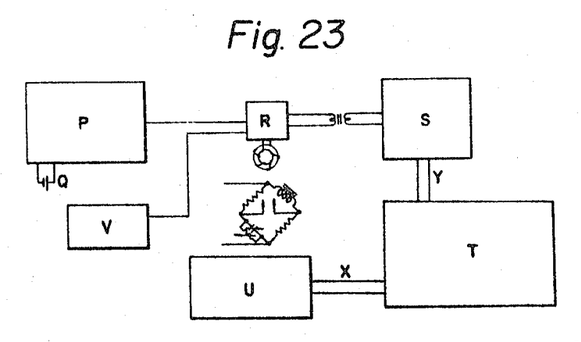
FIG. 23 shows a block diagram of accurate measurement apparatus for the disaccommodation phenomena.
Figure 24:
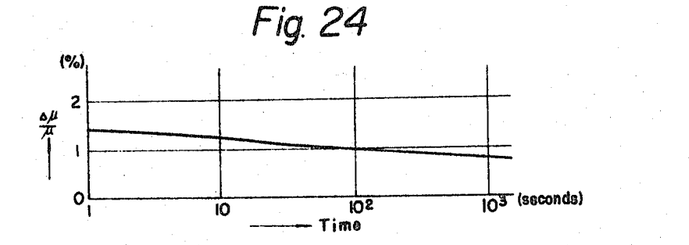
FIG. 24 is the result of the Mn-Zn ferrites with $\mu_0 = 5300$ produced by usual atmosphere controlling technique.
Figure 25:
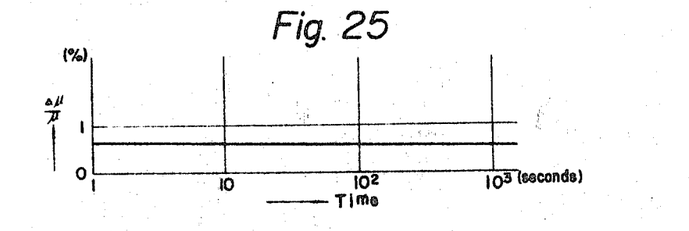
FIG. 25 is the result of the Mn-Zn ferrite with $\mu_0 = 3000$ obtained after applying the present invention (reduction of 0.1% of oxygen).
Figure 26:
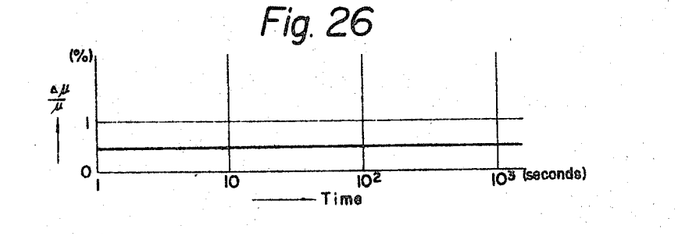
FIG. 26 is the result of the Mn-Zn ferrite with $\mu_0 = 800$ obtained after applying the present invention (reduction of 1% of oxygen).
Figure 27:
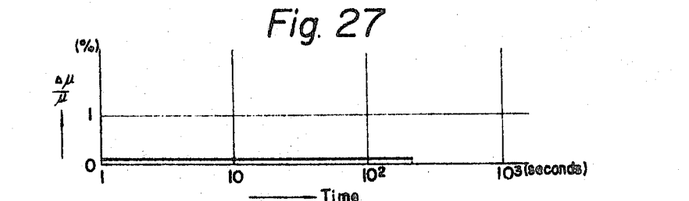
FIG. 27 is the result of a standard coil with air core.

FIG. 22 shows the difference in the disaccommodation of the two Mn-Zn ferrites H and J. FIG. 23 is a block-diagram of the apparatus for accurate measurement of disaccommodation. In this figure, P is an oscillator, Q is a standard cell, R is a Maxwell bridge, S is an amplifier, T is an X-Y recorder, U is a logarithmic time scale generator and V is an apparatus for demagnetization. FIGS. 24 and 25 represent the data for the specimen of curve I and curve IV of FIG. 20 employing the apparatus given in FIG. 23. FIG. 26 is for a similar specimen after being reduced by 1%. In this case disaccommodation is vanishing while $\mu_0$ is decreased to about 500. FIG. 27 is the data of the measurement for a solenoid. The fluctuation of room temperature was kept less than 0.05° during this measurement.

Next, examples of the application of the present invention are shown.

(1) Production of $Fe_3O_4$-$CoFe_2O_4$ series ferrites without magnetic after effect:

Co added magnetite, which was prepared beforehand, is annealed for 5 hours at 1000° C. in vacuum of $10^{-5}$ mm. Hg and quenched. Then, this material is sealed in an evacuated hard glass container, annealed for 24 hours at 700° C. and cooled slowly. This material for magnetostrictive usage is very stable when the operating temperature changes. No induced anisotropy appears at so high a temperature as 300° C.

(2) Production of Mn-Zn ferrite of high permeability, low loss and without disaccommodation:

$Mn_{0.510}Zn_{0.412}Fe_{2.078}O_4$ material was prepared beforehand with precise atmosphere control and has initial permeability, $\mu_0$ of 5000 and the disaccommodation, $\Delta\mu_0/\mu_0$ of 0.7% at $10^{-3}$ sec. after A.C. demagnetization. This material is sealed in an evacuated quartz container with fine powder of metallic iron placed in a different part of it, the amount of which is so determined as to reduce 0.1% oxygen of the material when the whole iron powder is oxidized into a $\alpha$-$Fe_2O_3$. Then the container is heated up to 1100° C., annealed for 12 hours at that temperature, cooled to 600° C. at the rate of 1° C./min., annealed again for 12 hours at 600° C. and cooled to room temperature at the rate of 1° C./min. By this heat treatment, $\Delta\mu_0/\mu_0$ at $10^3$ sec. after A.C. demagnetization decreases to less than 0.02%. Initial permeability of this material is 3000 and tan $\delta/\mu_0$ after the heat treatment is much smaller than that before.

(3) Production of Mn-Zn series ferrites of high permeability, low loss, low klirr factor and low disaccommodation:

Sintering in controlled atmosphere, we made beforehand Mn-Zn ferrite material which has such properties as follows: $\mu_0$=4800, $\Delta\mu_0/\mu_0$ at $10^3$ sec. after A.C. demagnetization is 0.4~1.0%, tan $\delta/\mu_0$=1.6×$10^{-5}$ (50 kc./sec.) and klirr factor $h_{10}$=60. This ferrite material is sealed in an evacuated quartz container with $$Fe_2O_3 + Fe_3O_4$$

powder in a separate part of it as automatic oxygen pressure controlling agent with buffer effect. The material is annealed for 25 hours at 800° C. and then cooled slowly. During the annealing, temperature difference between the magnetic material and the controlling agent is kept at 100° C. We are able to improve qualities markedly by this heat treatment; i.e., $\mu_0$ has increased to 5450, while $\Delta\mu_0/\mu_0$, tan $\delta/\mu_0$ and $h_{10}$ have decreased to 0.3%, 6×$10^{-6}$ and 28 respectively.

(4) The same as above:

Mn-Zn ferrite material of $\mu_0$=5250, tan $\delta/\mu_0$=1.4×$10^{-5}$ and $h_{10}$=60, prepared beforehand in controlled atmosphere, is sealed in an evacuated hard glass container with $Fe_3O_4$ powder, the amount of which is so determined as to reduce 0.03% oxygen of the material when whole powder is oxidized into $\alpha$-$Fe_2O_3$. Then the material is heat treated at 600° C. for 30 hours. This heat treatment decreases tan $\delta/\mu_0$ to 8×$10^{-6}$ and $h_{10}$ to 30, without changing $\mu_0$.

(5) The same as above:

$Mn_{0.510}Zn_{0.412}Fe_{2.078}O_4$, which was sintered beforehand in controlled atmosphere, is sealed in an evacuated quartz container with MnO-$Mn_3O_4$ as an automatic oxygen pressure controlling agent. The material is annealed for 18 hours at $T$=700° C. and cooled slowly to room temperature. During this annealing, temperature difference $T'-T$ is kept 200° C. ($T'$ is the temperature of MnO-$Mn_3O_4$ powder). The characteristics of the material after this heat treatment are as follows:

$$\mu_0=5150, \tan \delta/\mu_0=9\times 10^{-6}, h_{10}=45$$

(6) Production of disaccommodation less high quality Mn-Zn ferrite:

$Mn_{0.51}Zn_{0.412}Fe_{2.078}O_4$, which was sintered beforehand in controlled atmosphere, is annealed at $T$=700° C. for 25 hours in an evacuated quartz container. In the container, powdered mixture of MnO-$Mn_3O_4$ is also placed as an automatic oxygen pressure controlling agent and is heated up to 900° C. during the annealing. After this heat treatment, the product and iron powder are sealed again in another evacuated quartz container separately. The amount of the iron powder is determined to reduce the oxygen content of the material 0.001%. Then the material is submitted to a heat treatment as follows: annealing at 1100° C. for 12 hours, rapid cooling to 600° C., annealing for 12 hours at this temperature and slow cooling to room temperature. By this heat treatment, high quality magnetic material, such as no disaccommodation, tan $\delta/\mu_0$=6×$10^{-6}$ (100 kc./sec.) and $h_{10}$=30, is obtained.

It is to be understood that the foregoing description of specific examples of the present invention is not to be considered as a limitation on its scope.

TABLE 1

$\tau_R$ (seconds)

| $\rho$ | $10^{-3}$ | $10^{-4}$ | $10^{-5}$ | $10^{-6}$ | $10^{-7}$ | $10^{-8}$ | $10^{-9}$ | $10^{-10}$ | $10^{-11}$ |
|---|---|---|---|---|---|---|---|---|---|
| Q | | | | | | | | | |
| 1.6 | $10^{19}$ | | | | | | | | |
| 1.5 | $1.5\times 10^{17}$ | | | | | | | | |
| 1.4 | $2\times 10^{15}$ | | | | | | | | |
| 1.3 | $3\times 10^{13}$ | | | Region with $\tau_R$ of over 1 century | | | | | |
| 1.2 | $4\times 10^{11}$ | | | | | | | | |
| 1.1 | $0.6\times 10^{10}$ | | | | | | | | |
| 1.0 | $0.8\times 10^{8}$ | $0.8\times 10^{7}$ | $0.8\times 10^{6}$ | | | | | | |
| 0.9 | $1.2\times 10^{6}$ | $1.2\times 10^{7}$ | $1.2\times 10^{8}$ | $1.2\times 10^{9}$ | $1.2\times 10^{10}$ | | | | |
| 0.8 | $1.5\times 10^{4}$ | $1.5\times 10^{5}$ | $1.5\times 10^{6}$ | $1.5\times 10^{7}$ | $1.5\times 10^{8}$ | $1.5\times 10^{9}$ | $1.5\times 10^{10}$ | | |
| 0.7 | $2.5\times 10^{2}$ | $2.5\times 10^{3}$ | $2.5\times 10^{4}$ | $2.5\times 10^{5}$ | $2.5\times 10^{6}$ | $2.5\times 10^{7}$ | $2.5\times 10^{8}$ | $2.5\times 10^{9}$ | $2.5\times 10^{10}$ |
| 0.6 | 3 | $3\times 10^{1}$ | $3\times 10^{2}$ | $3\times 10^{3}$ | $3\times 10^{4}$ | $3\times 10^{5}$ | $3\times 10^{6}$ | $3\times 10^{7}$ | $3\times 10^{9}$ |
| 0.5 | $0.5\times 10^{-1}$ | 0.5 | 5 | $0.5\times 10^{2}$ | $0.5\times 10^{3}$ | $0.5\times 10^{4}$ | $0.5\times 10^{5}$ | $0.5\times 10^{6}$ | $0.5\times 10^{7}$ |
| 0.4 | $0.8\times 10^{-3}$ | $0.8\times 10^{-2}$ | $0.8\times 10^{-1}$ | 0.8 | 8 | $0.8\times 10^{2}$ | $0.8\times 10^{3}$ | $0.8\times 10^{4}$ | $0.8\times 10^{5}$ |

Q is shown by e.V. unit.

We claim:

1. A method of manufacturing an iron-containing ferromagnetic oxide without disaccommodation which comprises preparing an iron-containing ferromagnetic oxide by a controlled atmosphere heat treatment, placing the resultant ferromagnetic oxide in an air-tight container with an oxygen absorbing agent in an amount which is less than $10^{-3}$, and the tolerance of which is less than $5\times 10^{-4}$, in terms of the proportion of the amount of the oxygen capable of absorbing to the total amount of the oxygen content of said ferromagnetic oxide; evacuating the interior of the container; sealing the container; heating the sealed container to an annealing temperature; annealing the ferromagnetic oxide under the action of said agent; and cooling the container to room temperature.

2. A method of manufacture an iron-containing ferromagnetic oxide without disaccommodation which comprises preparing an iron-containing ferromagnetic oxide by a controlled atmosphere heat treatment; placing the resultant ferromagnetic oxide in an air-tight container with an oxygen supplying agent in an amount which is less than $10^{-3}$, and the tolerance of which is less than $5\times 10^{-4}$, in terms of the proportion of the amount of the oxygen capable of supplying to the total amount of the oxygen content of said ferromagnetic oxide; evacuating the interior of the container; sealing the container; heating the sealed container to an annealing temperature; annealing the ferromagnetic oxide under the action of said agent; and cooling the container to room temperature.

3. A method of manufacturing an iron-containing ferromagnetic oxide without disaccommodation which comprises preparing an iron-containing ferromagnetic oxide by a controlled atmosphere heat treatment; placing the resultant ferromagnetic oxide in an air-tight container; evacuating the interior of the container; adding a gas which contains oxygen in an amount which is less than $10^{-3}$, and the tolerance of which is less than $5 \times 10^{-4}$, in terms of the proportion of the amount of the oxygen content of the gas to the total amount of the oxygen content of said ferromagnetic oxide; sealing the container; heating the sealed container to an annealing temperature; annealing the ferromagnetic oxide under the action of said agent; and cooling the container to room temperature.

4. A method of manufacturing an iron-containing ferromagnetic oxide without disaccommodation which comprises preparing an iron-containing ferromagnetic oxide by a controlled atmosphere heat treatment; placing the resultant ferromagnetic oxide in an air-tight container; evacuating the interior of the container up to a pressure at which the amount of the oxygen present in the atmosphere of the container is less than $10^{-3}$, and the tolerance of which is less than $5 \times 10^{-4}$, in terms of the proportion of the amount of the oxygen content to the total amount of the oxygen content of said ferromagnetic oxide; sealing the container; heating the sealed container to an annealing temperature; annealing the ferromagnetic oxide under the action of said agent; and cooling the container to room temperature.

5. A method of manufacturing an iron-containing ferromagnetic oxide according to claim 2, in which the oxygen supplying agent consists of an iron-containing ferromagnetic oxide.

6. A method of manufacturing an iron-containing ferromagnetic oxide without disaccommodation which comprises preparing an iron-containing ferromagnetic oxide by a controlled atmosphere heat treatment; placing the resultant ferromagnetic oxide in an air-tight container with an oxygen pressure controlling agent, which gives a mixture of two species of oxides of the same metal with different degrees of oxidation, namely $MO_n$, $MO_m$, $0 \leq n < m$, in the subsequent heat treatment procedure, said oxygen pressure controlling agent being capable of adjusting less than $10^{-3}$ with the tolerance of less than $5 \times 10^{-4}$, in terms of the proportion of the amount of the oxygen content to be adjusted to the total amount of the oxygen content of said ferromagnetic oxide; evacuating the interior of the container; sealing the container; heating the sealed container; annealing the ferromagnetic oxide under the temperature dependent equilibrium oxygen pressure P(T) obtained by a chemical reaction $$MO_m \rightleftarrows MO_n + \frac{m-n}{2} O_2$$

between the two species of oxides maintained at a temperature different from that of the ferromagnetic oxide; and cooling the container.

7. A method of manufacturing an iron-containing ferromagnetic oxide according to claim 6, in which the temperature of the oxygen pressure controlling agent during the annealing of the ferromagnetic oxide is maintained at equal to the temperature of the ferromagnetic oxide being annealed.

8. A method of manufacturing an iron-containing ferromagnetic oxide according to claim 7, in which the oxygen pressure controlling agent consist of an iron-containing ferromagnetic oxide.

References Cited by the Examiner

UNITED STATES PATENTS 3,066,103  11/1962  Owen.

TOBIAS E. LEVOW, *Primary Examiner.*

R. D. EDMONDS, *Assistant Examiner.*